(12) United States Patent
Handing et al.

(10) Patent No.: US 9,187,054 B2
(45) Date of Patent: Nov. 17, 2015

(54) CROSS MEMBER FOR A MOTOR VEHICLE

(71) Applicant: Benteler Automobiltechnik GmbH, Paderborn (DE)

(72) Inventors: Christian Handing, Langenberg (DE); Michael Roll, Herford (DE); Dariusz Straznikiewicz, Paderborn (DE); Tobias Svantesson Kavik, Oslo (NO)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 14/162,335

(22) Filed: Jan. 23, 2014

(65) Prior Publication Data
US 2014/0203576 A1    Jul. 24, 2014

(30) Foreign Application Priority Data

Jan. 24, 2013    (DE) .......................... 10 2013 100 720

(51) Int. Cl.
*B60R 19/02* (2006.01)
*B60R 19/18* (2006.01)

(52) U.S. Cl.
CPC ............... *B60R 19/18* (2013.01); *B60R 19/023* (2013.01); *B60R 2019/1813* (2013.01)

(58) Field of Classification Search
CPC ...... B60R 19/18; B60R 19/02; B60R 19/023; B60R 2019/1806; B60R 2019/1813; B60R 2019/1826; B62D 25/08; B62D 25/085
USPC .......... 293/102, 132, 133; 296/187.09, 187.1, 296/187.11, 203.02
See application file for complete search history.

(56) References Cited

U.S. PATENT DOCUMENTS

| | | | |
|---|---|---|---|
| 2004/0007886 A1* | 1/2004 | Hallergren ..................... | 293/102 |
| 2009/0273197 A1* | 11/2009 | Muskos ........................ | 293/132 |
| 2009/0295177 A1* | 12/2009 | Asplund et al. ............... | 293/132 |
| 2010/0133859 A1* | 6/2010 | Lutke-Bexten et al. ...... | 293/102 |
| 2010/0133861 A1* | 6/2010 | Lutke-Bexten et al. ...... | 293/120 |
| 2010/0194125 A1* | 8/2010 | Wibbeke et al. .............. | 293/120 |

FOREIGN PATENT DOCUMENTS

| | | |
|---|---|---|
| DE | 102 26 756 | 1/2004 |
| WO | WO 2007084044 A1 * | 7/2007 |

* cited by examiner

*Primary Examiner* — Jason S Daniels
(74) *Attorney, Agent, or Firm* — Henry M. Feiereisen LLC

(57) ABSTRACT

A cross member for arrangement on a bumper system for a motor vehicle includes a single-piece open profile part made of uniform material and having a U-shaped cross section to define a first opening. The profile part has a curvature directed in a travel direction of the motor vehicle and includes a center zone having a second opening which is configured to point backwards in the travel direction, and end zones which have each an attachment area for a crash box and in which the first opening is configured to point forwards in the travel direction.

14 Claims, 4 Drawing Sheets

CROSS MEMBER FOR A MOTOR VEHICLE

CROSS-REFERENCES TO RELATED APPLICATIONS

This application claims the priority of German Patent Application, Serial No. 10 2013 100 720.1, filed Jan. 24, 2013, pursuant to 35 U.S.C. 119(a)-(d), the disclosure of which is incorporated herein by reference in its entirety as if fully set forth herein.

BACKGROUND OF THE INVENTION

The present invention relates to a cross member for a motor vehicle.

The following discussion of related art is provided to assist the reader in understanding the advantages of the invention, and is not to be construed as an admission that this related art is prior art to this invention.

It is known in the art to minimize damage of a motor vehicle in the event of an accident by outfitting the motor vehicle with a bumper system across the front and the back. In particular the front bumper system includes a cross member and crash boxes arranged at the ends of the cross member. The crash boxes, in turn, are mounted to longitudinal members of the motor vehicle. In the event the motor vehicle is involved in a head-on collision, crash energy is diverted via the cross member to the crash boxes which undergo a deformation to at least in part absorb the crash energy.

It would be desirable and advantageous to provide an improved cross member which obviates prior art shortcomings and exhibits high crash performance and stiffness while yet being lightweight and cost-effectively to manufacture.

SUMMARY OF THE INVENTION

According to one aspect of the present invention, a cross member for arrangement on a bumper system for a motor vehicle includes a single-piece open profile part made of uniform material and having a U-shaped cross section to define a first opening, the profile part having a curvature directed in a travel direction of the motor vehicle and including a center zone having a second opening which is configured to point backwards in the travel direction, and end zones which have each an attachment area for a crash box and in which the first opening of the profile part is configured to point forwards in the travel direction.

According to another feature of the present invention, the profile part may be made of metal, such as steel, especially hardened steel like steel 22MnB5, or of a light metal alloy, e.g. aluminum alloy like a 7000-series aluminum alloy.

For convenience and sake of simplicity, much of the following description relates primarily to a cross member for use across a front of a motor vehicle. It is, of course, to be understood that the principles described in the following description are equally applicable to a cross member for use across a rear of the motor vehicle, in which case all described features are respectively inverse in relation to the back-up travel direction.

The profile part of the cross member can be configured as open hollow profile, e.g. U-shaped profile or at least with regions of hat-shaped profile. The profile part can have in cross section a web and two legs respectively extending from the web. Advantageously, the web is oriented substantially vertically, with the legs extending from the web in substantially horizontal direction. The center zone of the profile part can extend essentially between two crash boxes and can transition via a transition zone with the end zones. An essential feature of the present invention is the realization of a substantial mirror image of the cross-sectional configuration from center zone to end zone. Thus, the U-shaped or hat-shaped cross-sectional profile of the center zone transitions with the (first) opening, which points backwards in relation to the travel direction, into the end zones such that the (second) opening of the U-shaped or hat-shaped cross-sectional profile in the end zones is configured to point forwards in travel direction. As a result, the cross member according to the present invention has the advantage of exhibiting in the center zone a high crash stiffness and a good and sufficient impact zone in view of the rearwardly directed opening and provides at the same time an attachment option for the crash boxes in the end zones in view of the rearwardly directed essentially vertical web. The profile part may therefore be formed as forming part, especially press part from a metal sheet in one piece and with uniform material, suitably by a single press operation.

As a result of the geometric configuration of a cross member according to the present invention, the need for additional reinforcement patches or further attachment parts and accompanying processing steps can thus be eliminated. A cross member according to the present invention can be produced as a single-piece forming part of uniform material from a single sheet metal blank, thereby reducing production costs and weight while still meeting demands for crash performance.

According to another feature of the present invention, the legs have ends which can each be formed with a flange so that the cross member exhibits a hat-shaped profile. The flanges extend substantially vertical and stiffen the cross member especially in the center zone.

According to another feature of the present invention, the legs can be oriented in the center zone as extending from the web backwards in the travel direction, and the legs can be oriented in the end zones as extending from the web forwards in the travel direction. Advantageously, when the legs are oriented in the center zone as extending from the web backwards in the travel direction, the cross member may have in the center zone a substantially U-shaped cross section, wherein the legs in the end zones, which extend from the web forwards in the travel direction, are each provided with a flange.

According to another feature of the present invention, the web, especially in the center zone, can be formed in midsection in relation to a motor vehicle vertical axis with a bead which is sized to extend at least along the center zone and in which the first opening of the profile part is configured to point forwards in the travel direction. The bead is thus oriented in opposition to the travel direction. Advantageously, the web can be formed with a converging embossment in midsection of the center zone. This facilitates production so as to provide a transition from the web of the center zone into the web of the end zones, while maintaining the strength in the transition zone.

According to another feature of the present invention, the bead may have a rounded cross-sectional profile in the center zone and an angular cross-sectional profile in the remaining zones. The rounded cross section of the bead provides sufficient strength of the cross member and at the same time subjects a forming tool for producing the cross member to less stress so that the service life of the forming tool can be significantly prolonged when compared to a forming tool that produces a substantially angular cross section.

According to another feature of the present invention, the bead may have an angular cross-sectional profile in a transition zone between the center zone and the end zones so that the bead transitions into the web of the end zones. This configuration provides high stiffness in the event of a head-on collision so that the crash boxes, arranged in the end zones, can absorb a respective crash energy.

Advantageously, the transition zone can be embossed or upset from the center zone to the end zones such as to establish a mirror image of the orientation of the cross-sectional configuration from the center zone to the end zones.

According to another feature of the present invention, the profile part can have a reinforcement rib extending along an entire width of the profile part, with the reinforcement rib having an opening which is oriented to extend backwards in the travel direction. Thus, the reinforcement rib extends over the entire width of the cross member along the web. As a result, stiffness is further increased and crash performance of the cross member according to the present invention is ensured. This configuration provides benefits when selecting an aluminum alloy as material.

According to another feature of the present invention, the legs can extend in the center zone at an angle to one another. Advantageously, the legs extend to one another in opposition to the travel direction at an angle. In combination with the transition zone, the U-shaped cross-sectional profile is spread apart or moved apart in the event of a crash.

According to another feature of the present invention, the attachment area for the crash box can be arranged at an angle in relation to a transverse direction of the motor vehicle. This again increases crash stiffness, especially in the event of a central head-on collision.

When using steel as material, e.g. boron-manganese steel 22MnB5, the cross member may have a wall thickness of 1.5 mm to 2 mm. Currently preferred is a wall thickness between 1.6 mm and 1.8 mm. When using a light metal material, e.g. aluminum-alloyed material, the cross member may have a wall thickness of 2 mm to 6 mm. Currently preferred is a wall thickness from 2.5 mm to 5.5 mm.

The profile part may be made as light metal part initially by extrusion which at least in part is heat treated and then cooled down. The cool-down process is followed by cold forming in a press to produce the finished part. When making the profile part from steel, the sheet metal blank is first cut to size and then especially hot formed and press-hardened. The press-hardening process may, optionally, be followed by a trimming process, e.g. by laser cutting, and the profile part may undergo a blasting process and a coating or surface treatment, for example with a liquid, for subsequent storage and further use.

A cross member of steel may be made from a tailored blank, in particular tailor welded blanks or tailored rolled blanks, i.e. a metal blank of different wall thicknesses which is produced either through partial rolling or joining of metal sheets of different wall thickness.

A cross member according to the present invention may be partially quenched and tempered or hardened. Advantageously, the attachment area for a crash box may be partially quenched and tempered so as to substantially prevent crack formation in the event of a crash and thus a separation, with the remaining zones having sufficiently high hardness.

According to another feature of the present invention, the profile part is defined by a height which in a longitudinal direction can be substantially the same across an entire width of the profile part of the profile part in relation to a motor vehicle vertical axis. This ensures that legal or production-based minimum specifications are met. Advantageously, the cross member is configured with its legs or flanges extending from the legs such as to have in motor vehicle z-direction essentially a same height across the entire width. The height may exceed 90 mm, especially exceed 100 mm or range from 100 mm to 200 mm. Currently preferred is a height from 100 mm to 150 mm.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 3a is a perspective view of another embodiment of a cross member according to the present invention;

FIG. 3b is a front view of the cross member of FIG. 3a;

FIG. 3c is a top view of the cross member of FIG. 3a;

DETAILED DESCRIPTION OF PREFERRED EMBODIMENTS

Figure 1:
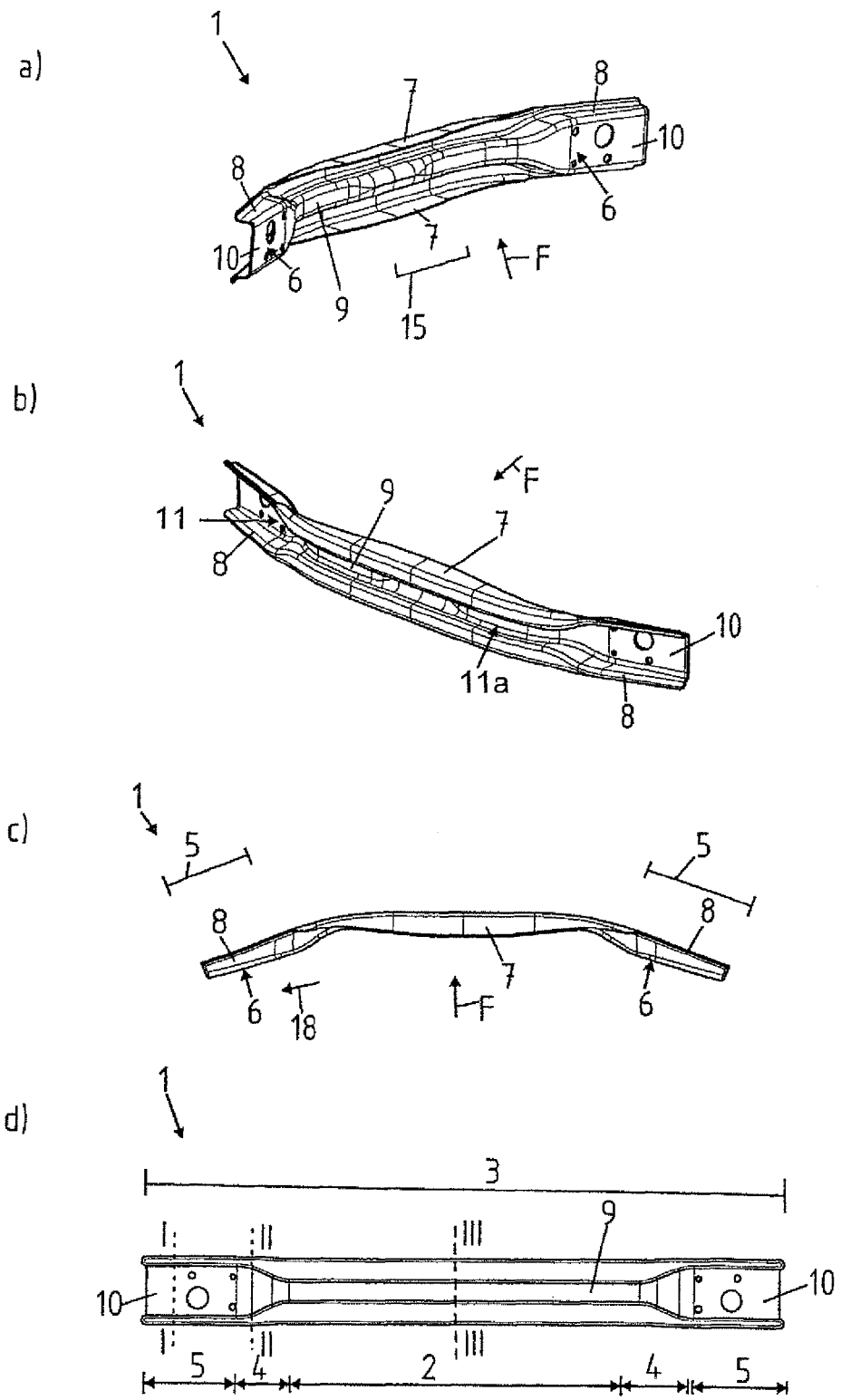
FIG. 1a is a rear perspective view of one embodiment of a cross member according to the present invention.
FIG. 1b is a front perspective view of the cross member.
FIG. 1c is a top view of the cross member.
FIG. 1d is a front view of the cross member.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1a, there is shown a rear perspective view of one embodiment of a cross member according to the present invention, generally designated by reference numeral 1 and made of steel. The cross member 1 is made of a profile part and has a U-shaped configuration with forwardly pointing opening 11. The cross member 1 includes a center zone 2 sized to extend at least over part of an entire width 3 (FIG. 1d) of the cross member 1. The center zone 2 transitions on opposite ends via respective transition zones 4 into end zones 5. Each end zone 5 has on its backside an attachment area 6 for attachment of a not shown crash box. As shown in particular in FIG. 1c, the entire cross member 1 is oriented in travel direction F with an arched profile in motor vehicle transverse direction 18. The center part 2 has legs 7 which, oriented in travel direction F, point backwards, and the end zones 5 have each a leg 8, which oriented in travel direction, points forwards, as shown in FIG. 1b.

The center zone 2 further includes a bead 9 which is sized to substantially extend over the width of the center zone 2. The bead 9 transitions in the transition zones 4 into a web 10 of each end zone 5. As best seen from FIGS. 1a, 1b, the bead 9 is oriented in opposition to the travel direction F and has an opening 11a which also points forwardly in travel direction F, as shown in FIG. 1b.

Figure 2:
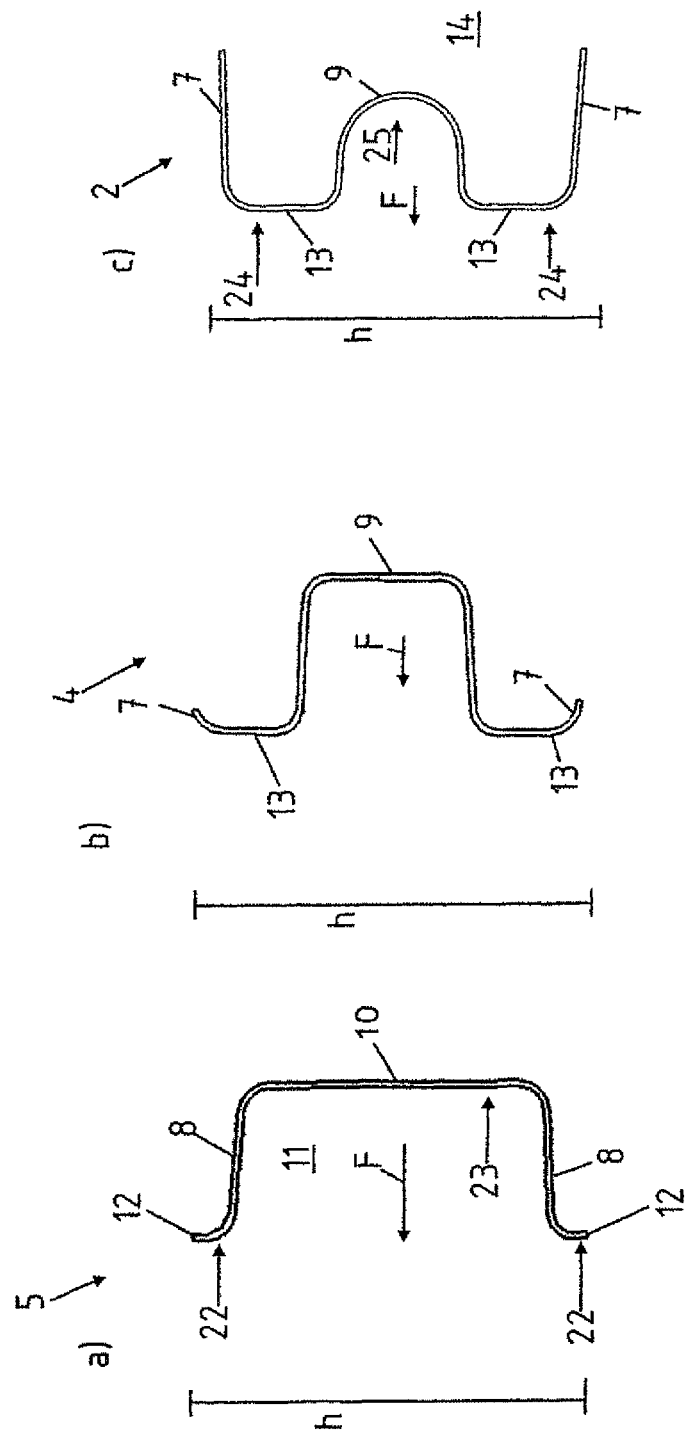
FIG. 2a is a sectional view of the cross member, taken along the line I-I in FIG. 1d.
FIG. 2b is a sectional view of the cross member, taken along the line II-II in FIG. 1d.
FIG. 2c is a sectional view of the cross member, taken along the line III-III in FIG. 1d.

FIG. 2a is a sectional view of the cross member 1, taken along the line I-I in FIG. 1d, and shows that the web 10 is oriented in travel direction F backwards. As a result, the opening 11 points in travel direction forwards. The legs 8 of the web 10 are also oriented in travel direction F, with each of the legs 8 being continued at their ends by flanges 12, respectively, which extend substantially vertically from the legs 8.

FIG. 2b is a sectional view of the cross member 1, taken along the line II-II in FIG. 1d and shows the bead 9 arranged in opposition to the travel direction F. In the transition zone 4, the bead 9 has an angular cross-sectional configuration, with the center zone 2 having a web 13 which begins in the transition zone 4, as do the legs 7 which extend from the web 13 of the center zone 2 and are oriented in opposition to the travel direction F. The web 13 of the center zone 2 is breached in midsection by the bead 9.

FIG. 2c is a sectional view of the cross member 1, taken along the line III-III in FIG. 1d and shows the presence in the center zone 2 of an opening 14 which points backwards in opposition to the travel direction F. The legs 7 of the web 13 of the center zone 2 are also oriented in opposition to the travel direction F. The web 13 of the center zone 2 is thus arranged forwards in travel direction F to provide a greatest possible impact surface. The bead 9 is here also oriented in opposition to the travel direction F and has a round cross-sectional configuration in the center zone 2. As indicated in FIG. 1a, a midsection 15 is located in the center zone 2 wherein the bead 9 is configured to transition in the center zone 2 from a round cross-sectional configuration in midsection 15 into an angular cross-sectional configuration towards the transition zones 4 and end zones 5.

The various cross sections of the cross member 1 according to FIGS. 2a to 2c are defined by a height h which is the same in all cross sections. Thus, the height h of the cross member 1 is thus substantially the same over its entire width. The flanges 12 of the legs 8 in each end zone 2 form an end face 22 at a proportion of between 0% and 20% of the entire end face of the cross member 1. The web 13 in the center zone 2 and transition zones 4 form an end face 24 at a proportion of more than 50% of the entire end face of the cross member 1, i.e. both end faces 24 jointly make up more than 50%. The end face 24 of the web 13 is at least greater than an end face 25 of the bead 9, with the end face 25 of the bead 9 making up less than 50% of the end face of the cross member 1.

Figure 3:
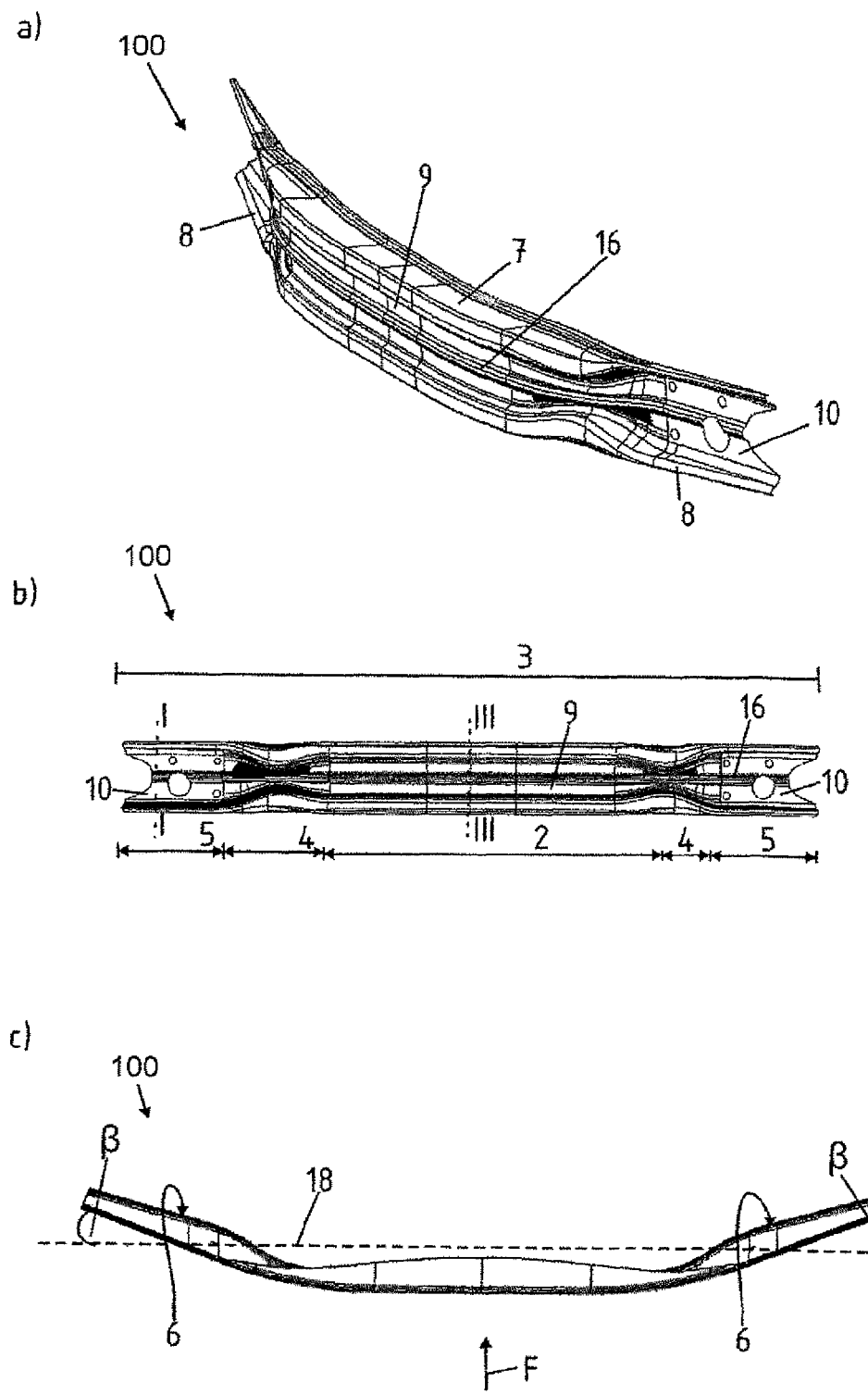

FIG. 3a is a perspective view of another embodiment of a cross member according to the present invention, generally designated by reference numeral 100 and made of a light metal alloy. Parts corresponding with those of the cross member 1 are denoted by identical reference numerals and not explained again. The description below will center on the differences between the embodiments. In this embodiment, provision is made for a reinforcement rib 16 in the bead 9. The reinforcement rib 16 extends over the entire width 3 of the cross member 100. This is also clearly shown in FIG. 3b which is a front view of the cross member 100.

FIG. 3c is a top view of the cross member 100 and shows the attachment areas 6 for crash boxes. The attachment areas 6 are each arranged an angle β in relation to the motor vehicle transverse direction 18.

Figure 4:
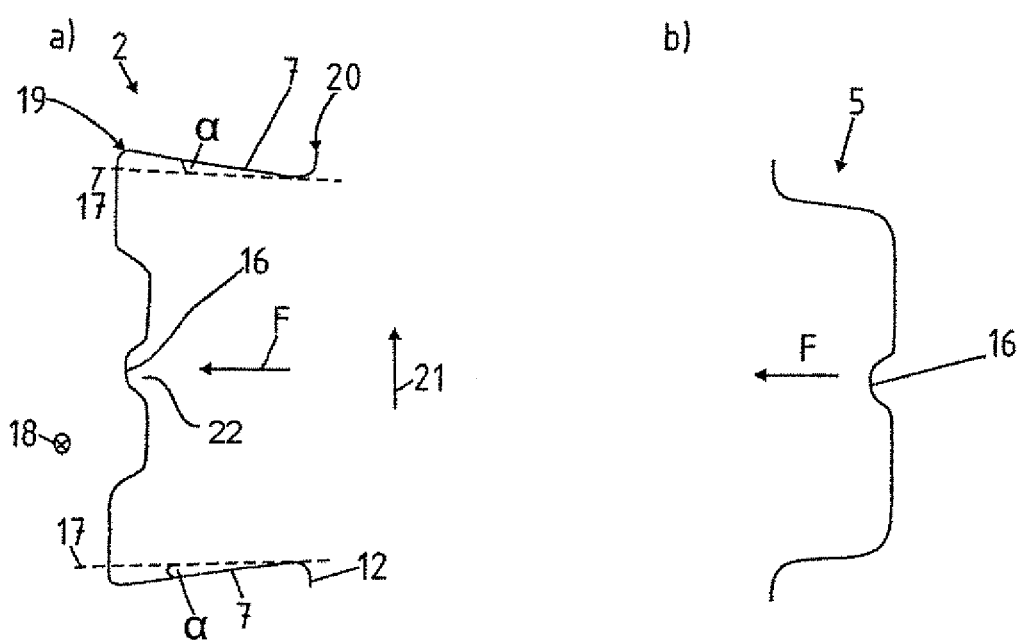
FIG. 4a is a sectional view of the cross member, taken along the line III-III in FIG. 3b.
FIG. 4b is a sectional view of the cross member, taken along the line I-I in FIG. 3b.

FIGS. 4a and 4b are sectionals views of the cross member 100, taken along the line III-III and line I-I, respectively, in FIG. 3b and show that the reinforcement rib 16 is always oriented in travel direction F and has an opening 22 which is oriented to point backwards in opposition to the travel direction F. In this way, the reinforcement rib 16 provides the cross member 100 with an enhanced bending stiffness in motor vehicle transverse direction 18. One leg 7, advantageously both legs 7, of the center zone 2 is/are arranged at an angle α in relation to a central longitudinal axis 17. FIG. 4a further shows the presence of an upper rounding 19 in alignment with a free end 20 of the respective flange 12 in relation to the motor vehicle vertical axis 21. This ensures that the projecting flange 12 is prevented from colliding with other components in view of the packaging specification for the cross member 100.

The cross member 100 is made through extrusion and has varying wall thicknesses so that the wall thickness in the area of the rounding 19 is advantageously between 2 mm and 4 mm, preferably 3 mm, and the wall thickness in the area of the legs 7 is 4 mm to 6 mm, advantageously 5 mm. The flange 12 may have a wall thickness between 2 mm and 4 mm, advantageously 3 mm.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A cross member for arrangement on a bumper system for a motor vehicle, said cross member comprising a single-piece open profile part made of uniform material and having a U-shaped cross section to define a first opening, said profile part having a curvature directed in a travel direction of the motor vehicle and including a center zone having a second opening which is configured to point backwards in the travel direction, and end zones which have each an attachment area for a crash box and in which the first opening of the profile part is configured to point forwards in the travel direction, wherein the profile part has in cross section a web and two legs respectively extending from the web, wherein the legs extend in opposition to the travel direction toward one another at an angle.

2. The cross member of claim 1, wherein the legs have ends, each of the ends being formed with a flange.

3. The cross member of claim 1, wherein the web is formed in midsection in relation to a motor vehicle vertical axis with a bead which is used to extend at least along the center zone and has a third opening configured to point forwards in the travel direction.

4. The cross member of claim 3, wherein the bead has a rounded cross-sectional profile in the center zone.

5. The cross member of claim 3, wherein the bead has an angular cross-sectional profile in a transition zone between the center zone and the end zones.

6. The cross member of claim 5, wherein the bead is configured to transition from the transition zone into the web of the end zones.

7. The cross member of claim 1, wherein the profile part has a reinforcement rib extending along the entire width of the profile part, said reinforcement rib having a fourth opening which is oriented to extend backwards in the travel direction.

8. The cross member of claim 1, wherein the legs extend in the center zone at an angle to one another.

9. The cross member of claim 1, wherein the attachment area for the crash box is arranged at an angle in relation to a motor vehicle transverse direction.

10. The cross member of claim 9, wherein the angle ranges between 5° and 30°.

11. The cross member of claim 9, wherein the angle ranges Between 10° and 25°.

12. The cross member of claim 1, wherein the profile part is made of steel, when undergoing a forming process, or light metal alloy, when undergoing an extrusion process.

13. The cross member of claim 12, wherein the light metal alloy undergoes a forming process after the extrusion process.

14. The cross member of claim 1, wherein the profile part is defined by a height which in a longitudinal direction is substantially the same across an entire width of the profile part in relation to a motor vehicle vertical axis.

* * * * *